US012306961B2

(12) United States Patent
Ohkawa

(10) Patent No.: US 12,306,961 B2
(45) Date of Patent: May 20, 2025

(54) IMAGE PROCESSING APPARATUS AND CONTROL METHOD

(71) Applicant: CANON KABUSHIKI KAISHA, Tokyo (JP)

(72) Inventor: Shuichi Ohkawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 303 days.

(21) Appl. No.: 17/955,639

(22) Filed: Sep. 29, 2022

(65) Prior Publication Data

US 2023/0128724 A1 Apr. 27, 2023

(30) Foreign Application Priority Data

Oct. 25, 2021 (JP) ................................ 2021-174069

(51) Int. Cl.
*G06F 21/60* (2013.01)
*G06F 21/62* (2013.01)
*G06T 11/00* (2006.01)

(52) U.S. Cl.
CPC ........ *G06F 21/602* (2013.01); *G06F 21/6218* (2013.01); *G06T 11/00* (2013.01); *G06F 21/6245* (2013.01)

(58) Field of Classification Search
None
See application file for complete search history.

(56) References Cited

U.S. PATENT DOCUMENTS

| 4,372,656 A | * | 2/1983 | Marks | G03B 35/26 |
| | | | | 352/198 |
| 4,385,467 A | * | 5/1983 | Samuels | A63F 9/12 |
| | | | | 446/99 |
| 4,934,824 A | * | 6/1990 | Ling | G03B 35/12 |
| | | | | 352/213 |
| 4,963,015 A | * | 10/1990 | Ling | G03B 35/00 |
| | | | | 352/213 |

(Continued)

FOREIGN PATENT DOCUMENTS

| JP | 4209128 B2 | 1/2009 |
| JP | 5993575 B2 | 9/2016 |

(Continued)

OTHER PUBLICATIONS

Rieger et al "Digital Image Recording for Court-Related Purposes," IEEE, pp. 262-279 (Year: 1999).*

(Continued)

*Primary Examiner* — Luu T Pham
*Assistant Examiner* — James J Wilcox
(74) *Attorney, Agent, or Firm* — Carter, DeLuca & Farrell LLP

(57) ABSTRACT

An image processing apparatus comprises an image processing unit configured to generate an image to be saved, and a control unit configured to control the image processing unit in response to an instruction for generating a second image from a first image and saving the second image. When the second image is saved in response to the instruction, the image processing unit adds protection information to the second image and save the second image, the protection information being recorded in the first image for protecting at least a part of the image.

6 Claims, 10 Drawing Sheets

(56) References Cited

U.S. PATENT DOCUMENTS

| | | | | |
|---|---|---|---|---|
| 5,130,794 | A * | 7/1992 | Ritchey | H04N 13/38 348/E13.052 |
| 5,574,836 | A * | 11/1996 | Broemmelsiek | H04N 13/279 348/E13.019 |
| 5,615,046 | A * | 3/1997 | Gilchrist | H04N 13/339 359/464 |
| 5,717,522 | A * | 2/1998 | Hattori | H04N 13/305 359/464 |
| 5,805,120 | A * | 9/1998 | Yamada | A63F 9/0291 359/630 |
| 5,818,399 | A * | 10/1998 | Omori | H04N 13/31 348/E13.058 |
| 5,908,117 | A * | 6/1999 | Stroman | B65G 17/08 198/850 |
| 5,940,641 | A * | 8/1999 | McIntyre | H04N 23/00 396/326 |
| 5,982,342 | A * | 11/1999 | Iwata | H04N 13/305 348/E13.058 |
| 6,078,423 | A * | 6/2000 | Orr | G02B 30/26 359/462 |
| 6,101,007 | A * | 8/2000 | Yamasaki | G02B 5/0252 359/13 |
| 6,111,597 | A * | 8/2000 | Tabata | H04N 13/128 348/E13.047 |
| 6,157,474 | A * | 12/2000 | Orr | G02B 5/0252 359/24 |
| 6,222,672 | B1 * | 4/2001 | Towler | H04N 13/337 348/E13.058 |
| 6,256,372 | B1 * | 7/2001 | Aufrichtig | G01N 23/044 348/E13.008 |
| 6,302,541 | B1 * | 10/2001 | Grossmann | H04N 13/324 348/E13.043 |
| 6,304,288 | B1 * | 10/2001 | Hamagishi | H04N 13/346 348/E13.05 |
| 6,351,660 | B1 * | 2/2002 | Burke | G06T 7/0012 600/443 |
| 6,414,681 | B1 * | 7/2002 | Ohshima | H04N 13/398 345/428 |
| 6,489,962 | B1 * | 12/2002 | Ambroziak | H04N 13/334 348/E13.037 |
| 6,535,226 | B1 * | 3/2003 | Sorokin | H04N 7/181 715/740 |
| 6,538,761 | B1 * | 3/2003 | Yokono | G06F 21/6218 358/1.15 |
| 6,564,225 | B1 * | 5/2003 | Brogliatti | G06F 16/532 |
| 6,593,957 | B1 * | 7/2003 | Christie | H04N 13/305 348/42 |
| 7,039,614 | B1 * | 5/2006 | Candelore | G06F 21/6218 380/255 |
| 7,162,035 | B1 * | 1/2007 | Durst | G06F 21/602 380/54 |
| 7,190,518 | B1 * | 3/2007 | Kleinberger | G02B 30/25 348/57 |
| 7,213,211 | B1 * | 5/2007 | Sanders | G09B 5/08 715/755 |
| 7,482,996 | B2 * | 1/2009 | Larson | G02B 27/0101 359/630 |
| 7,664,263 | B2 * | 2/2010 | Moskowitz | G06F 21/16 713/176 |
| 7,805,749 | B1 * | 9/2010 | Harvey | G06Q 30/0251 725/86 |
| 8,102,413 | B2 * | 1/2012 | Mehrle | G02B 30/30 348/42 |
| 8,171,567 | B1 * | 5/2012 | Fraser | G06K 7/10792 726/32 |
| 8,379,048 | B2 * | 2/2013 | Samworth | H04N 1/54 345/604 |
| 8,537,201 | B2 * | 9/2013 | Choi | H04N 13/194 348/43 |
| 8,752,145 | B1 * | 6/2014 | Dotan | G06F 21/32 726/8 |
| 8,891,765 | B1 * | 11/2014 | Dorwin | H04N 21/24 380/201 |
| 9,191,238 | B2 * | 11/2015 | Douris | G06F 3/0484 |
| 9,423,602 | B1 * | 8/2016 | Dolgoff | H04N 13/324 |
| 9,495,366 | B2 * | 11/2016 | Wetmore | G06F 16/9535 |
| 9,618,746 | B2 * | 4/2017 | Browne | G02B 27/017 |
| 9,619,660 | B1 * | 4/2017 | Felix | G06F 21/6218 |
| 9,635,317 | B1 * | 4/2017 | Ludwig | H04N 21/4223 |
| 9,654,844 | B2 * | 5/2017 | Kim | H04N 21/4622 |
| 9,762,553 | B2 * | 9/2017 | Ford | G06F 21/602 |
| 9,830,505 | B2 * | 11/2017 | Fithian | G06F 18/214 |
| 9,908,482 | B1 * | 3/2018 | Falstrup | F16M 13/00 |
| 9,980,140 | B1 * | 5/2018 | Spencer | H04W 12/02 |
| 10,114,451 | B2 * | 10/2018 | Martin | G06F 3/04815 |
| 10,152,775 | B1 * | 12/2018 | Bellows | G06T 5/80 |
| 10,154,040 | B2 * | 12/2018 | Cheatham, III | H04L 63/102 |
| 10,168,798 | B2 * | 1/2019 | Tsang | H04N 13/398 |
| 10,192,084 | B1 * | 1/2019 | Sharma | G07G 1/009 |
| 10,275,020 | B2 * | 4/2019 | Cohen | G06F 3/04815 |
| 10,284,794 | B1 * | 5/2019 | Francois | G06T 7/33 |
| 10,541,999 | B1 * | 1/2020 | Rosenberg | G06V 40/172 |
| RE47,968 | E * | 4/2020 | Harvey | H04N 21/458 |
| 10,691,674 | B2 * | 6/2020 | Leong | G06Q 50/10 |
| 10,705,339 | B2 * | 7/2020 | Border | G02B 27/10 |
| 10,826,791 | B2 * | 11/2020 | Lilienthal | H04L 67/131 |
| 10,902,282 | B2 * | 1/2021 | Winter | G06F 11/34 |
| 10,944,758 | B1 * | 3/2021 | Nagargadde | G06F 21/6218 |
| 11,003,706 | B2 * | 5/2021 | Raichelgauz | G06V 20/41 |
| 11,057,644 | B2 * | 7/2021 | Horiuchi | G06F 21/84 |
| 11,095,706 | B1 * | 8/2021 | Ankam | H04L 67/51 |
| 11,138,333 | B2 * | 10/2021 | Streit | G06V 10/454 |
| 11,144,638 | B1 * | 10/2021 | Golden | G06F 21/566 |
| 11,171,950 | B1 * | 11/2021 | Zhuravlev | H04L 67/141 |
| 11,210,375 | B2 * | 12/2021 | Streit | G06V 40/45 |
| 11,213,237 | B2 * | 1/2022 | Bardy | A61B 5/332 |
| 11,221,778 | B1 * | 1/2022 | Miller | G06F 16/1752 |
| 11,282,147 | B2 * | 3/2022 | Mossoba | G06Q 40/12 |
| 11,353,711 | B1 * | 6/2022 | Freeman | G09G 3/007 |
| 11,487,890 | B2 * | 11/2022 | Thomson | H04L 67/53 |
| 11,515,032 | B2 * | 11/2022 | Dormer | G16H 10/20 |
| 11,611,587 | B2 * | 3/2023 | Moridi | H04L 63/102 |
| 11,628,995 | B1 * | 4/2023 | Lai | B65D 73/0064 206/15 |
| 11,698,996 | B2 * | 7/2023 | Koyuncu | G06F 21/72 713/193 |
| 11,934,322 | B1 * | 3/2024 | Miller | G06F 3/061 |
| 12,222,501 | B1 * | 2/2025 | Kalinowski | G02C 5/22 |
| 2001/0015753 | A1 * | 8/2001 | Myers | H04N 13/305 348/E13.058 |
| 2001/0040342 | A1 * | 11/2001 | Matos | A63F 9/0613 273/157 R |
| 2002/0005820 | A1 * | 1/2002 | Son | H04N 13/337 348/E13.058 |
| 2002/0030163 | A1 * | 3/2002 | Zhang | G02B 27/1066 348/E5.09 |
| 2002/0051177 | A1 * | 5/2002 | Nomoto | H04N 1/00164 358/1.15 |
| 2002/0089744 | A1 * | 7/2002 | Myers | G02B 5/045 348/E13.058 |
| 2002/0120757 | A1 * | 8/2002 | Sutherland | H04L 67/02 709/229 |
| 2002/0171424 | A1 * | 11/2002 | Morich | G01R 33/385 324/309 |
| 2003/0106063 | A1 * | 6/2003 | Guedalia | H04N 21/4331 348/E7.071 |
| 2003/0117528 | A1 * | 6/2003 | Liang | G06T 13/80 348/584 |
| 2003/0120183 | A1 * | 6/2003 | Simmons | A61F 4/00 600/595 |
| 2003/0154386 | A1 * | 8/2003 | Wittkotter | G06F 21/6218 713/193 |
| 2003/0187409 | A1 * | 10/2003 | Erickson | A61M 5/31 604/240 |
| 2003/0214533 | A1 * | 11/2003 | Cull | G09B 9/302 715/771 |
| 2004/0061726 | A1 * | 4/2004 | Dunn | G06T 19/003 715/855 |

(56) References Cited

U.S. PATENT DOCUMENTS

| | | | |
|---|---|---|---|
| 2004/0172537 A1* | 9/2004 | Baus | G06F 21/6218 713/170 |
| 2004/0255495 A1* | 12/2004 | Watkins | B42F 17/02 40/359 |
| 2005/0097046 A1* | 5/2005 | Singfield | G06Q 20/1085 705/42 |
| 2005/0128286 A1* | 6/2005 | Richards | H04N 21/431 348/E5.123 |
| 2005/0219357 A1* | 10/2005 | Sun | H04N 13/337 348/57 |
| 2005/0231513 A1* | 10/2005 | LeBarton | G09B 19/00 345/473 |
| 2005/0289559 A1* | 12/2005 | Illowsky | G06F 8/63 719/318 |
| 2006/0047659 A1* | 3/2006 | Yagiura | G06F 21/6218 707/999.009 |
| 2006/0061595 A1* | 3/2006 | Goede | G06F 16/51 707/E17.031 |
| 2006/0101288 A1* | 5/2006 | Smeets | H04L 9/3234 713/194 |
| 2006/0197832 A1* | 9/2006 | Yamada | G02B 27/017 348/E5.145 |
| 2006/0209181 A1* | 9/2006 | Van Geest | H04N 13/194 348/E7.083 |
| 2006/0242159 A1* | 10/2006 | Bishop | G16H 40/67 |
| 2006/0272033 A1* | 11/2006 | Paris | G06F 21/6218 726/32 |
| 2006/0277287 A1* | 12/2006 | McCall | G06Q 10/06 709/223 |
| 2007/0132953 A1* | 6/2007 | Silverstein | H04N 13/337 348/E13.058 |
| 2007/0168467 A1* | 7/2007 | Hu | G06Q 10/08 709/219 |
| 2008/0010875 A1* | 1/2008 | Kuwabara | B60K 35/10 40/424 |
| 2008/0021834 A1* | 1/2008 | Holla | G16H 80/00 705/51 |
| 2008/0168135 A1* | 7/2008 | Redlich | G06F 21/6218 709/204 |
| 2008/0235764 A1* | 9/2008 | Cohen | G06F 21/6218 726/1 |
| 2009/0292739 A1* | 11/2009 | Marsh | G06Q 10/10 715/764 |
| 2010/0033813 A1* | 2/2010 | Rogoff | G02B 30/27 348/E13.001 |
| 2010/0053310 A1* | 3/2010 | Maxson | H04N 13/194 348/E13.001 |
| 2010/0110427 A1* | 5/2010 | Amary | G01J 3/2823 356/369 |
| 2010/0253769 A1* | 10/2010 | Coppeta | G02B 27/286 353/7 |
| 2011/0010776 A1* | 1/2011 | Ceraolo | G06Q 10/087 726/28 |
| 2011/0221866 A1* | 9/2011 | Ohta | A63F 13/26 348/46 |
| 2012/0110429 A1* | 5/2012 | Tzonis | G06Q 10/10 715/256 |
| 2012/0156668 A1* | 6/2012 | Zelin | G09B 5/12 434/362 |
| 2012/0166582 A1* | 6/2012 | Binder | G06F 7/58 709/217 |
| 2012/0235999 A1* | 9/2012 | Bi | H04N 13/286 345/426 |
| 2012/0260108 A1* | 10/2012 | Lee | G06F 21/6218 713/189 |
| 2012/0275643 A1* | 11/2012 | Beckford | G06Q 30/0603 382/100 |
| 2012/0293407 A1* | 11/2012 | Lee | G02B 27/017 345/156 |
| 2013/0024382 A1* | 1/2013 | Dala | H04L 63/0464 705/51 |
| 2013/0054467 A1* | 2/2013 | Dala | G06F 21/6245 705/51 |
| 2013/0097517 A1* | 4/2013 | Reiss | G06F 21/6218 715/741 |
| 2013/0104056 A1* | 4/2013 | Halliday | H04L 51/52 715/753 |
| 2013/0321912 A1* | 12/2013 | Igler | G02B 30/27 359/463 |
| 2014/0028670 A1* | 1/2014 | Tsurumi | G09G 5/14 345/419 |
| 2014/0123323 A1* | 5/2014 | Jung | H04L 67/60 726/30 |
| 2014/0130117 A1* | 5/2014 | Jeannot | G06F 21/34 726/4 |
| 2014/0132772 A1* | 5/2014 | Billau | H04N 7/18 348/159 |
| 2014/0177049 A1* | 6/2014 | Beck | G02B 30/25 359/464 |
| 2014/0250300 A1* | 9/2014 | Runkis | H04L 9/0894 713/165 |
| 2014/0283142 A1* | 9/2014 | Shepherd | G06F 3/04817 726/30 |
| 2014/0293017 A1* | 10/2014 | Fei | G06F 3/0325 348/51 |
| 2015/0082460 A1* | 3/2015 | Amiga | H04L 63/145 726/28 |
| 2015/0104013 A1* | 4/2015 | Holman | H04L 63/061 380/243 |
| 2015/0150519 A1* | 6/2015 | Glenn | G06F 3/04847 715/771 |
| 2015/0160457 A1* | 6/2015 | Larson | G02B 27/0101 359/630 |
| 2015/0172300 A1* | 6/2015 | Cochenour | G06F 21/6218 726/23 |
| 2015/0180833 A1* | 6/2015 | Snow | G06Q 10/10 713/155 |
| 2015/0235044 A1* | 8/2015 | Cohen | G06F 21/6218 726/17 |
| 2015/0269466 A1* | 9/2015 | Inotay | H04L 63/0823 235/494 |
| 2015/0338942 A1* | 11/2015 | Stone | G06F 3/04845 345/173 |
| 2015/0341566 A1* | 11/2015 | Nonaka | H04N 5/265 348/36 |
| 2016/0004862 A1* | 1/2016 | Almehmadi | G06F 21/6218 726/25 |
| 2016/0042537 A1* | 2/2016 | Ng | G06T 11/005 382/131 |
| 2016/0054863 A1* | 2/2016 | Elmieh | H04N 21/47217 715/716 |
| 2016/0063314 A1* | 3/2016 | Samet | G06F 21/31 348/78 |
| 2016/0065571 A1* | 3/2016 | Hoyos | H04L 63/0428 713/168 |
| 2016/0147492 A1* | 5/2016 | Fugate | G06F 3/1423 345/633 |
| 2016/0286210 A1* | 9/2016 | Border | G02B 7/08 |
| 2016/0294781 A1* | 10/2016 | Ninan | H04L 63/0428 |
| 2016/0306989 A1* | 10/2016 | Embleton | H04L 63/102 |
| 2016/0344995 A1* | 11/2016 | Bruls | H04N 13/122 |
| 2016/0352518 A1* | 12/2016 | Ford | G06F 21/6218 |
| 2017/0041593 A1* | 2/2017 | Wu | H04N 13/31 |
| 2017/0052661 A1* | 2/2017 | Thelin | H04L 67/60 |
| 2017/0068804 A1* | 3/2017 | Wichmann | G06F 21/125 |
| 2017/0109505 A1* | 4/2017 | Nakata | H04L 63/10 |
| 2017/0116440 A1* | 4/2017 | Huang | G06F 21/87 |
| 2017/0206370 A1* | 7/2017 | Bahrs | G06F 21/602 |
| 2017/0212352 A1* | 7/2017 | Cobb | G02B 27/0179 |
| 2017/0237747 A1* | 8/2017 | Quinn | G06F 21/602 726/29 |
| 2017/0238808 A1* | 8/2017 | Simpson | A61B 8/0841 |
| 2017/0270310 A1* | 9/2017 | Becker | G06F 21/556 |
| 2017/0294045 A1* | 10/2017 | Cabral | G06T 5/50 |
| 2018/0011973 A1* | 1/2018 | Fish | A61B 5/1176 |
| 2018/0041699 A1* | 2/2018 | Tohara | H04N 13/344 |
| 2018/0060989 A1* | 3/2018 | Hietanen | G06Q 30/04 |
| 2018/0068108 A1* | 3/2018 | Fish | G06F 21/316 |

(56) References Cited

U.S. PATENT DOCUMENTS

| | | | |
|---|---|---|---|
| 2018/0172991 A1* | 6/2018 | Iwashita | B60J 1/008 |
| 2018/0205546 A1* | 7/2018 | Haque | H04L 9/3213 |
| 2018/0268541 A1* | 9/2018 | Kruecker | G06F 3/017 |
| 2018/0270463 A1* | 9/2018 | Sou | H04N 13/117 |
| 2018/0307814 A1* | 10/2018 | Renard | G06F 21/64 |
| 2018/0341779 A1* | 11/2018 | Sawant | G06F 21/31 |
| 2018/0342222 A1* | 11/2018 | Kang | G09G 5/14 |
| 2018/0359259 A1* | 12/2018 | Leon | G06F 9/445 |
| 2018/0365593 A1* | 12/2018 | Galitsky | G06F 16/36 |
| 2019/0007212 A1* | 1/2019 | Neve de Mevergnies | H04L 9/3226 |
| 2019/0044939 A1* | 2/2019 | Smith | G06F 21/53 |
| 2019/0138740 A1* | 5/2019 | Ricknäs | G06F 3/04842 |
| 2019/0201124 A1* | 7/2019 | Shelton, IV | H04L 9/32 |
| 2019/0205441 A1* | 7/2019 | Shelton, IV | G06F 16/2477 |
| 2019/0228174 A1* | 7/2019 | Withrow | H04L 9/3278 |
| 2019/0246149 A1* | 8/2019 | Reza | H04N 21/23476 |
| 2019/0251279 A1* | 8/2019 | Emberson | G06F 21/602 |
| 2019/0361917 A1* | 11/2019 | Tran | H04W 12/108 |
| 2019/0362147 A1* | 11/2019 | Adam | G06N 5/048 |
| 2019/0362836 A1* | 11/2019 | Gruemer | G16H 30/40 |
| 2019/0379683 A1* | 12/2019 | Overby | H04W 12/122 |
| 2019/0384065 A1* | 12/2019 | Shau | G02C 11/10 |
| 2020/0051054 A1* | 2/2020 | McGough | H04L 9/3234 |
| 2020/0081847 A1* | 3/2020 | Oster | G06F 12/145 |
| 2020/0134202 A1* | 4/2020 | Sapuntzakis | H04L 9/0891 |
| 2020/0139631 A1* | 5/2020 | Buller | G05B 19/4099 |
| 2020/0159937 A1* | 5/2020 | Schondorf | G06F 21/554 |
| 2020/0163645 A1* | 5/2020 | Ewald | G06T 7/10 |
| 2020/0202027 A1* | 6/2020 | Chan | G06V 10/955 |
| 2020/0210553 A1* | 7/2020 | Lin | G06N 3/084 |
| 2020/0242978 A1* | 7/2020 | De Meerleer | G09F 9/3026 |
| 2020/0260067 A1* | 8/2020 | Li | H04N 13/31 |
| 2020/0265124 A1* | 8/2020 | Li | H04L 9/0637 |
| 2020/0265147 A1* | 8/2020 | Li | H04L 63/0428 |
| 2020/0278613 A1* | 9/2020 | Nilsson | G06F 3/0604 |
| 2020/0294293 A1* | 9/2020 | Boenig, II | G06T 11/60 |
| 2020/0364189 A1* | 11/2020 | Lee | G06F 21/64 |
| 2020/0368616 A1* | 11/2020 | Delamont | H04N 13/239 |
| 2020/0387591 A1* | 12/2020 | Witchey | G06F 21/32 |
| 2021/0004909 A1* | 1/2021 | Farmer | G06Q 40/08 |
| 2021/0056525 A1* | 2/2021 | Miller | G06Q 30/016 |
| 2021/0067764 A1* | 3/2021 | Shau | A61B 90/361 |
| 2021/0074063 A1* | 3/2021 | Smets | G06T 19/006 |
| 2021/0109793 A1* | 4/2021 | Cheng | G06F 21/16 |
| 2021/0110055 A1* | 4/2021 | Miller | H04L 63/10 |
| 2021/0110311 A1* | 4/2021 | Cheng | G06N 5/02 |
| 2021/0110312 A1* | 4/2021 | Cheng | H04L 9/3239 |
| 2021/0144441 A1* | 5/2021 | Shetty | G06F 21/32 |
| 2021/0157680 A1* | 5/2021 | LeCrone | G06F 11/1464 |
| 2021/0193297 A1* | 6/2021 | Buckland | G16H 30/40 |
| 2021/0286531 A1* | 9/2021 | Adrian | G06F 21/6218 |
| 2021/0294920 A1* | 9/2021 | Sachs | H04L 9/3239 |
| 2021/0303718 A1* | 9/2021 | Singh | G06F 21/84 |
| 2021/0312057 A1* | 10/2021 | Kloth | G06F 21/575 |
| 2021/0344893 A1* | 11/2021 | Kusafuka | G09G 5/10 |
| 2021/0390663 A1* | 12/2021 | Kanga | H04N 1/00872 |
| 2022/0086008 A1* | 3/2022 | Keech | G06F 16/9566 |
| 2022/0108213 A1* | 4/2022 | Cao | G06N 3/045 |
| 2022/0121764 A1* | 4/2022 | Buscemi | G06T 5/70 |
| 2022/0141026 A1* | 5/2022 | Smith | H04L 9/0891 713/181 |
| 2022/0187771 A1* | 6/2022 | Ganz | G06F 3/04812 |
| 2022/0292221 A1* | 9/2022 | Sohail | H04L 63/105 |
| 2022/0337804 A1* | 10/2022 | Lin | H04N 13/31 |
| 2022/0368810 A1* | 11/2022 | Inoue | G06F 21/6245 |
| 2023/0071020 A1* | 3/2023 | Liu | G06F 21/335 |
| 2023/0088007 A1* | 3/2023 | Hartwig | G02B 27/01 359/632 |
| 2023/0103518 A1* | 4/2023 | Rogers | G06F 21/53 726/26 |
| 2023/0128724 A1* | 4/2023 | Ohkawa | G06F 21/602 726/28 |
| 2023/0181014 A1* | 6/2023 | Baumann | A61B 5/6847 600/111 |
| 2023/0214532 A1* | 7/2023 | Xu | H04L 63/205 726/26 |
| 2023/0231982 A1* | 7/2023 | Korman | H04N 23/698 348/43 |
| 2023/0245280 A1* | 8/2023 | Itakura | H04N 13/122 382/100 |
| 2023/0245330 A1* | 8/2023 | Nadir | G06T 5/77 382/100 |
| 2023/0259638 A1* | 8/2023 | Yang | G06F 21/755 726/26 |
| 2023/0296906 A1* | 9/2023 | Hsiao | G02B 27/026 345/7 |
| 2023/0305310 A1* | 9/2023 | Ninan | G02B 27/286 |
| 2023/0351048 A1* | 11/2023 | Zhong | G06F 21/44 |
| 2023/0362348 A1* | 11/2023 | Matsuda | G02B 27/0093 |
| 2023/0394521 A1* | 12/2023 | Rajendran | G06F 3/0304 |
| 2024/0005009 A1* | 1/2024 | Khanal | G06F 21/6209 |
| 2024/0080285 A1* | 3/2024 | Wu | H04L 51/10 |
| 2024/0153257 A1* | 5/2024 | Jin | H04L 43/0841 |
| 2024/0290032 A1* | 8/2024 | Hall | G06T 15/205 |
| 2025/0063153 A1* | 2/2025 | Van Kuringen | H04N 13/302 |

FOREIGN PATENT DOCUMENTS

| | | | | |
|---|---|---|---|---|
| KR | 20130126800 A | * | 11/2013 | G06F 21/6227 |
| WO | 2010/070490 A1 | | 6/2010 | |
| WO | WO-2020246166 A1 | * | 12/2020 | G06F 21/16 |

OTHER PUBLICATIONS

Kim et al "Real-Time Streaming Image Based PP2LFA-CRNN Model for Facial Sentiment Analysis," IEEE, pp. 199586-199602 (Year: 2020).*

Lee et al "Network Accessable Security Web-based Camera Server System using Index Search Algorithm," IEEE, pp. 60-65 (Year: 2001).*

Fenzi et al "ASEV-Automatic Situation Assessment for Event-Driven Video Analysis," 2014 11th IEEE International Conference on Advanced Video and Signal Based Surveillance, IEEE, pp. 37-43 (Year: 2014).*

Grusho et al "The Research of a Method to Identify a Workplace via a Monitor Snapshot," IEEE, pp. 1-6 (Year: 2020).*

Adams et al "New Concepts in Display Technology," IEEE, pp. 1-9 (Year: 1979).*

Komuro et al "A Reconfigurable Embedded System for 1000 f/s Real-Time Vision," IEEE Transactions on Circuits and Systems for Video Technology, vol. 20, No. 4, Apr. 2010, pp. 496-504 (Year: 2010).*

Wang et al "Review of Multi view Auto-Stereoscopic Display System Based on Depth Image Analysis," 2017 19th International Conference on E-Health Networking, Application & Services (HealthCom), IEEE pp. 81-86 (Year: 2017).*

Wang et al "A Blockchain-based System for Secure Image Protection Using Zero-Watermark," IEEE, pp. 62-70 (Year: 2020).*

Peidong et al "The Realization of Fast Importing and Exporting Remote Sensing Images Database," IEEE, pp. 3047-3050 (Year: 2007).*

* cited by examiner

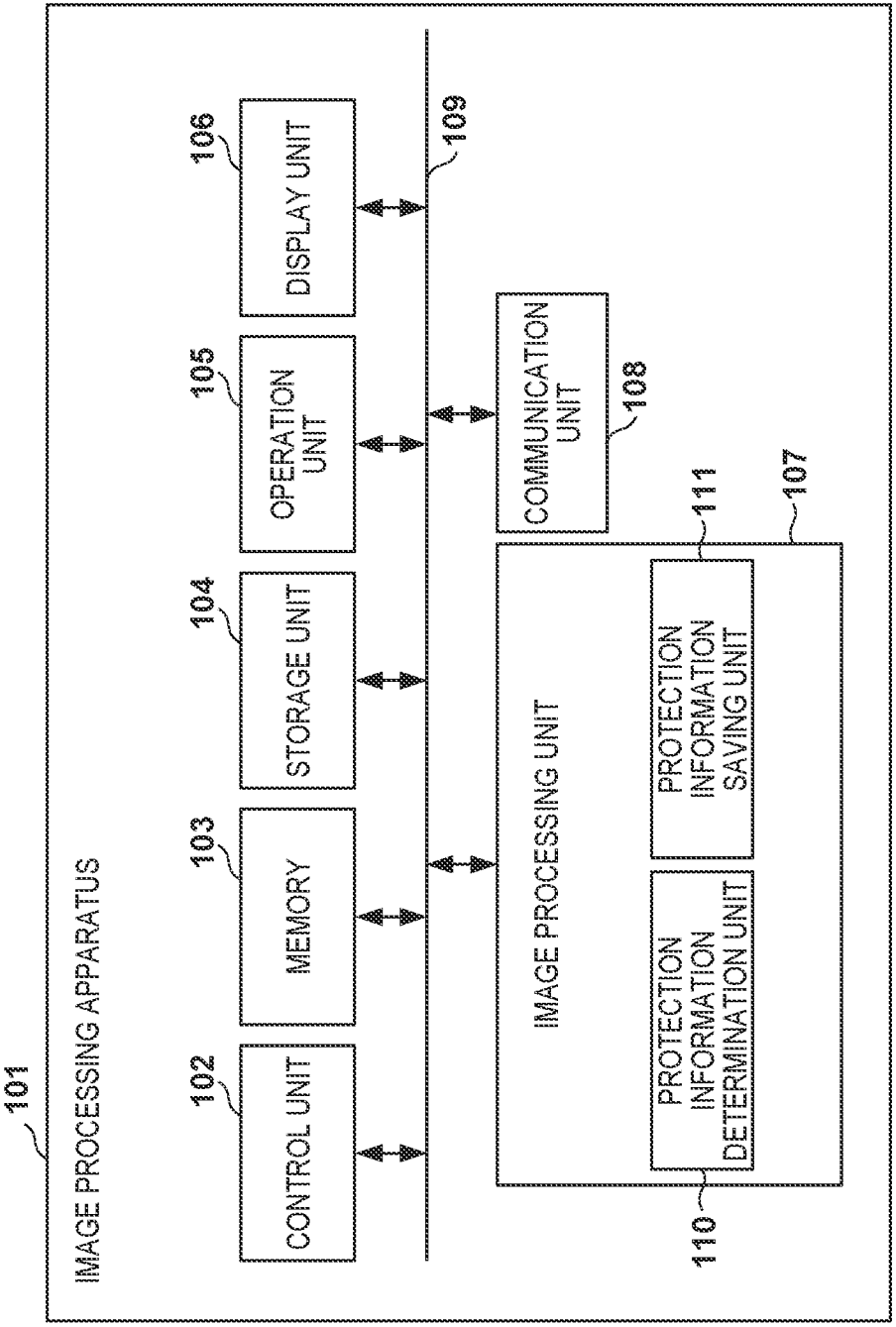

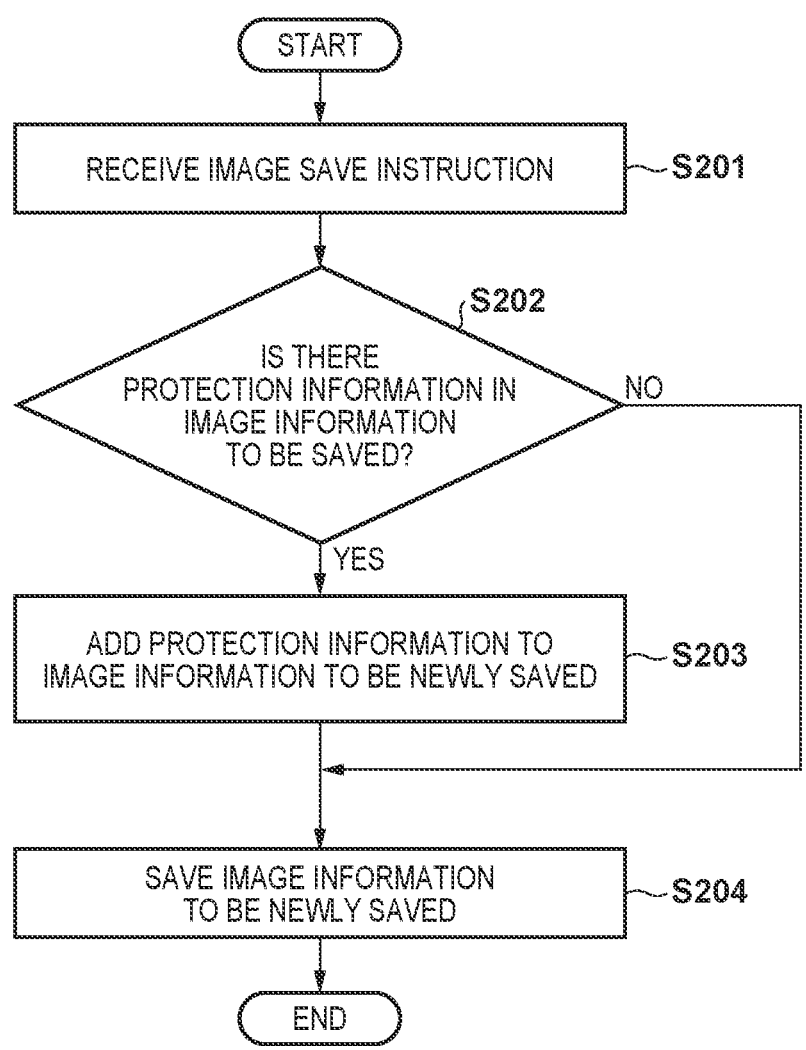

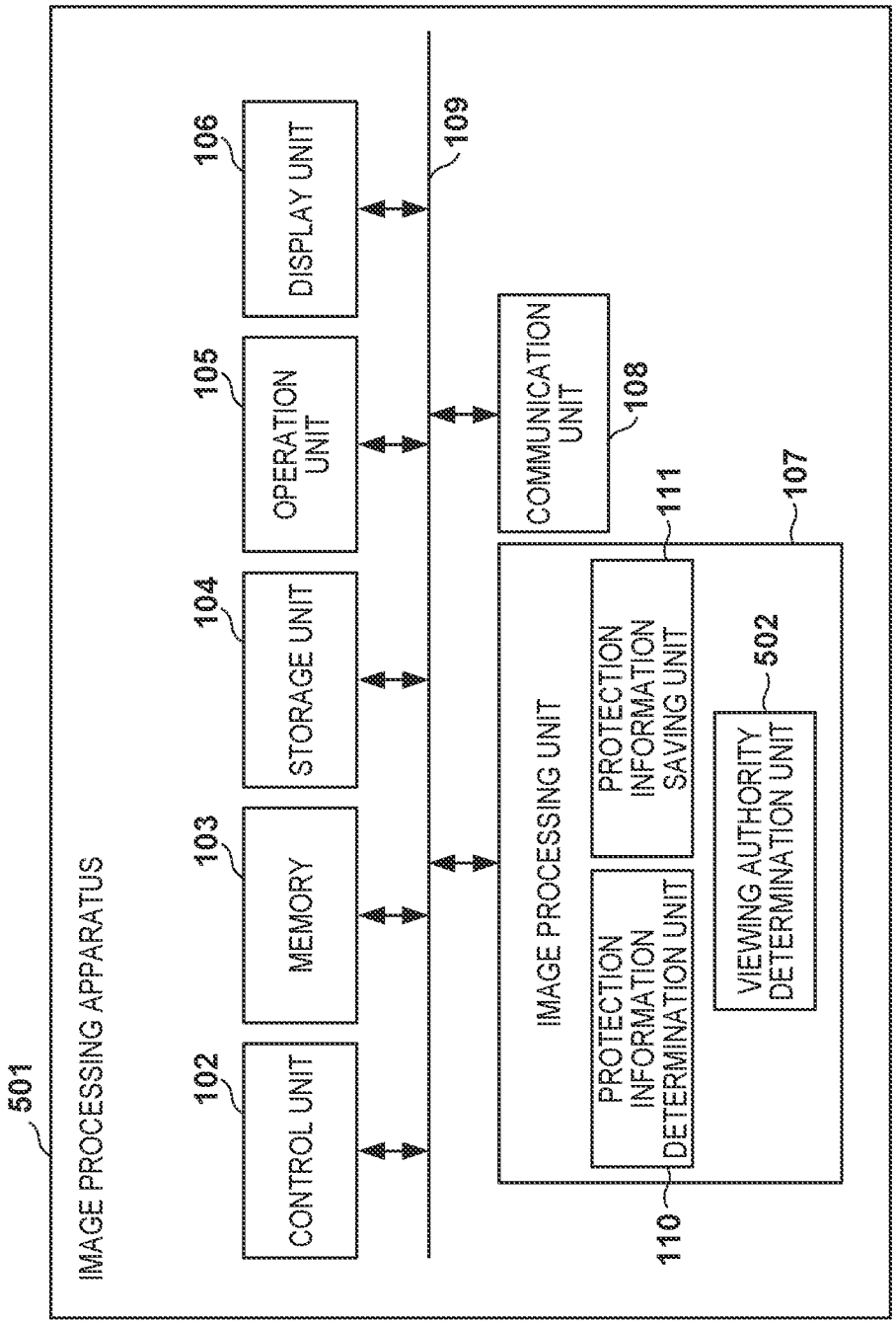

IMAGE PROCESSING APPARATUS AND CONTROL METHOD

BACKGROUND OF THE INVENTION

Field of the Invention

The present invention relates to an image processing technique of saving or displaying an image viewing of which is restricted.

Description of the Related Art

There has been known a technique of partially masking an image with mosaic processing or the like for the sake of privacy protection. Japanese Patent No. 5993575 describes a medical imaging system with which a protection part of a screenshot is masked, and the resultant image is attached to an email. However, when an image is permanently masked, switching is required between an image provided to a user who should not view the image and an image provided to a user who can view the image.

In view of this, a technique of displaying an image with a mask removed to a user with a viewing authority, and displaying an image in which a protection part is replaced with another image to a user without the viewing authority has been proposed in ISO/IEC 19566-4. Japanese Patent No. 4209128 describes a technique with which certain information is appended to image data, and the certain information is removed at the time of resaving, so that whether image data is resaved image data or the original image data can be determined.

However, when in a state where a user with the viewing authority viewing the image with the mask removed, an image of the screen (a screenshot image) is captured and saved, the image with the mask removed is saved. This means that this image, which can be viewable for the users without the viewing authority, may be redistributed.

SUMMARY OF THE INVENTION

The present invention has been made in consideration of the aforementioned problems, and realizes techniques enabling, in a case where a new image is generated from an original image and saved, the same protection as the original image to be given to the newly saved image.

In order to solve the aforementioned problems, the present invention provides an image processing apparatus comprising: an image processing unit configured to generate an image to be saved; and a control unit configured to control the image processing unit in response to an instruction for generating a second image from a first image and saving the second image, wherein when the second image is saved in response to the instruction, the image processing unit adds protection information to the second image and save the second image, the protection information being recorded in the first image for protecting at least a part of the image.

In order to solve the aforementioned problems, the present invention provides an image processing apparatus comprising: an image processing unit configured to generate an image to be displayed; and a control unit configured to control the image processing unit in response to an instruction for displaying the image, wherein the image processing unit includes: a protection information determination unit configured to determine whether protection information for protecting at least a part of the image is recorded in the image to be displayed; and a viewing authority determination unit configured to determine whether a user has a viewing authority for the image to be displayed.

In order to solve the aforementioned problems, the present invention provides a method of controlling an image processing apparatus comprising: receiving an instruction for generating a second image from a first image and saving the second image; and in case of saving the second image in response to the instruction, adding protection information to the second image and saving the second image, the protection information being added to the first image for protecting at least a part of the image.

In order to solve the aforementioned problems, the present invention provides a method of controlling an image processing apparatus comprising: generating an image to be displayed in response to an instruction for displaying the image, wherein the generating includes: determining whether protection information for protecting at least a part of the image is recorded in the image to be displayed; and determining whether a user has a viewing authority for the image to be displayed.

In order to solve the aforementioned problems, the present invention provides a non-transitory computer-readable storage medium storing a program for causing a computer to function as an image processing apparatus comprising: an image processing unit configured to generate an image to be saved; and a control unit configured to control the image processing unit in response to an instruction for generating a second image from a first image and saving the second image, wherein when the second image is saved in response to the instruction, the image processing unit adds protection information to the second image and save the second image, the protection information being recorded in the first image for protecting at least a part of the image.

In order to solve the aforementioned problems, the present invention provides a non-transitory computer-readable storage medium storing a program for causing a computer to function as an image processing apparatus comprising: an image processing unit configured to generate an image to be displayed; and a control unit configured to control the image processing unit in response to an instruction for displaying the image, wherein the image processing unit includes: a protection information determination unit configured to determine whether protection information for protecting at least a part of the image is recorded in the image to be displayed; and a viewing authority determination unit configured to determine whether a user has a viewing authority for the image to be displayed.

According to the present invention, in a case where anew image is generated from an original image and saved, the same protection as the original image can be given to the newly saved image.

Further features of the present invention will become apparent from the following description of exemplary embodiments (with reference to the attached drawings).

BRIEF DESCRIPTION OF THE DRAWINGS

FIG. 1 is a block diagram illustrating a configuration of an apparatus according to a first embodiment.

FIG. 2 is a flowchart illustrating image saving processing according to the first embodiment.

FIG. 5 is a block diagram illustrating a configuration of an apparatus according to a second embodiment.

DESCRIPTION OF THE EMBODIMENTS

Figure 3A:
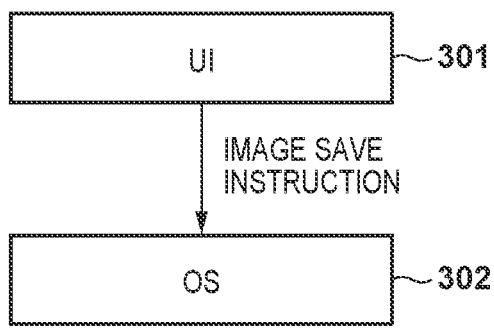
FIG. 3A to FIG. 3C are diagrams illustrating image save instructions according to the first embodiment.

Hereinafter, embodiments will be described in detail by referring to the accompanying drawings. The following embodiments do not limit the invention according to the claims. Although a plurality of features is described in the embodiments, some of the plurality of features may not be essential to the invention, and the plurality of features may be arbitrarily combined. Further, in the accompanying drawings, identical or similar components are denoted by identical reference signs, and redundant description will be omitted.

While an image processing apparatus according to the present invention is applied to an information processing apparatus such as a personal computer (PC) or an information processing terminal such as a smart device and a tablet PC in the embodiments described below, the image processing apparatus according to the present invention is not limited to these and may be also applied to an imaging apparatus such as a digital camera that can capture images.

First Embodiment

In a first embodiment, an example of a configuration will be described where when image information is to be newly saved as a screenshot image of a display screen or a copied image, if protection information for protecting at least a part of an image unviewable is recorded in the image information of the source image for saving, the image information to be newly saved is saved in a state of the protection information also added thereto.

<Apparatus Configuration>

First, a configuration and functions of an image processing apparatus according to the present embodiment will be described with reference to FIG. 1.

FIG. 1 is a block diagram illustrating the configuration of the image processing apparatus according to the present embodiment.

An image processing apparatus 101 includes a control unit 102, a memory 103, a storage unit 104, an operation unit 105, a display unit 106, an image processing unit 107, a communication unit 108, and a bus 109.

The control unit 102 includes an arithmetic operation processor such as a CPU and an MPU that controls the entire image processing apparatus 101. The control unit 102 implements processing of embodiments described below by executing programs stored in the storage unit 104 described below.

The memory 103 is a RAM or the like used as a work area for deploying constants and variables for operation of the control unit 102, a program read out from the storage unit 104, and the like. The memory 103 is used as a buffer memory that temporarily holds data and commands (instructions) to be output to the control unit 102.

The storage unit 104 is a ROM, a memory card, a hard disk, or the like that stores an operating system (OS) that is basic software executed by the control unit 102 or an application for implementing an applicative function in cooperation with the OS. The storage unit 104 stores a program for causing the control unit 102 to execute processing in the first embodiment and a second embodiment described below.

The operation unit 105 is an operation member such as a mouse or a keyboard that receives a user operation, and outputs various instructions to the control unit 102. The operation unit 105 is integrally formed with the display unit 106, and includes a touch panel configured to operate an image, a UI screen, or the like.

The display unit 106 is a display device such as a display or a monitor including an LCD or organic EL. The display unit 106 displays images held by the image processing apparatus 101, as well as webpages and images received over a network by the communication unit 108 as described below. In addition, the display unit 106 displays a UI screen for interactive operations.

The image processing unit 107 includes a GPU that executes processing such as modification of an image, color conversion of an image, and combining of images, processing such as reading-out/writing-in of additional information (metadata) recorded in a file of image information, and the like. The image processing unit 107 executes processing for generating image information from the webpages or the images displayed on the display unit 106.

The image processing unit 107 includes a protection information determination unit 110 and a protection information saving unit 111. The protection information determination unit 110 determines whether the protection information is recorded in the image information to be saved. The protection information saving unit 111 adds the protection information recorded in the image information to be saved to the image information to be newly saved and save.

In the present embodiment, the image information to be saved is original image information for generating a screenshot image or a copy image.

The protection information is information for applying mask processing or the like on a protection region included in at least a part of the image information to be saved, to make the protection region unviewable for the sake of protection. The protection region is the face of a person in the image, confidential information, and the like. In the case of a screenshot image, a plurality of images may be displayed in one screen, and thus may include a plurality of protection regions.

In the protection information, as described below with reference to FIG. 6, data with the image of the protection region encrypted and coordinate data indicating a position where a decrypted image is to be restored for the image having the mask processing applied on the protection region are recorded. The protection information is recorded as metadata in the image information, or is recorded as a metadata file separate from the image information.

To decrypt the encrypted data included in the protection information, key information is required. Thus, the presence or absence of the key information respectively indicates viewable or unviewable for the image information to be saved or the protection region of the image information to be displayed. The key information may be included in the protection information, but is preferably managed separately from the protection information and acquired from the outside over a network or the like, for restriction of viewing by users without viewing authority as described in a second embodiment below.

The communication unit 108 is an interface that is communicably connected to a network such as the Internet or a local area network (LAN).

The bus 109 connects each of the components 102 to 108 of the image processing apparatus 101 such that data can be transmitted and received between the components.

<Image Saving Processing>

Now, image saving processing according to the present embodiment will be described with reference to FIG. 2.

FIG. 2 is a flowchart illustrating image saving processing according to the present embodiment.

The processing in FIG. 2 is implemented by the control unit 102 of the image processing apparatus 101 executing a program stored in the storage unit 104, and controlling each of the components of the image processing apparatus 101. The processing in FIG. 2 starts when a screenshot instruction or a copy instruction is input to the control unit 102 by the user operating the operation unit 105 in a state in which a webpage or an image is displayed on the display unit 106 of the image processing apparatus 101.

In the following description, the image information to be saved includes one with the protection information recorded, and one without the protection information recorded.

In step S201, when the operation unit 105 receives an image save instruction, the control unit 102 generates the image information to be saved from the image displayed on the display unit 106, and waits until the image saving processing becomes executable by the control unit 102, with the image information to be saved and the image save instruction held in the memory 103. Once the image saving processing becomes executable by the control unit 102, the control unit 102 outputs the image information to be saved and the image save instruction to the image processing unit 107.

Figure 4:
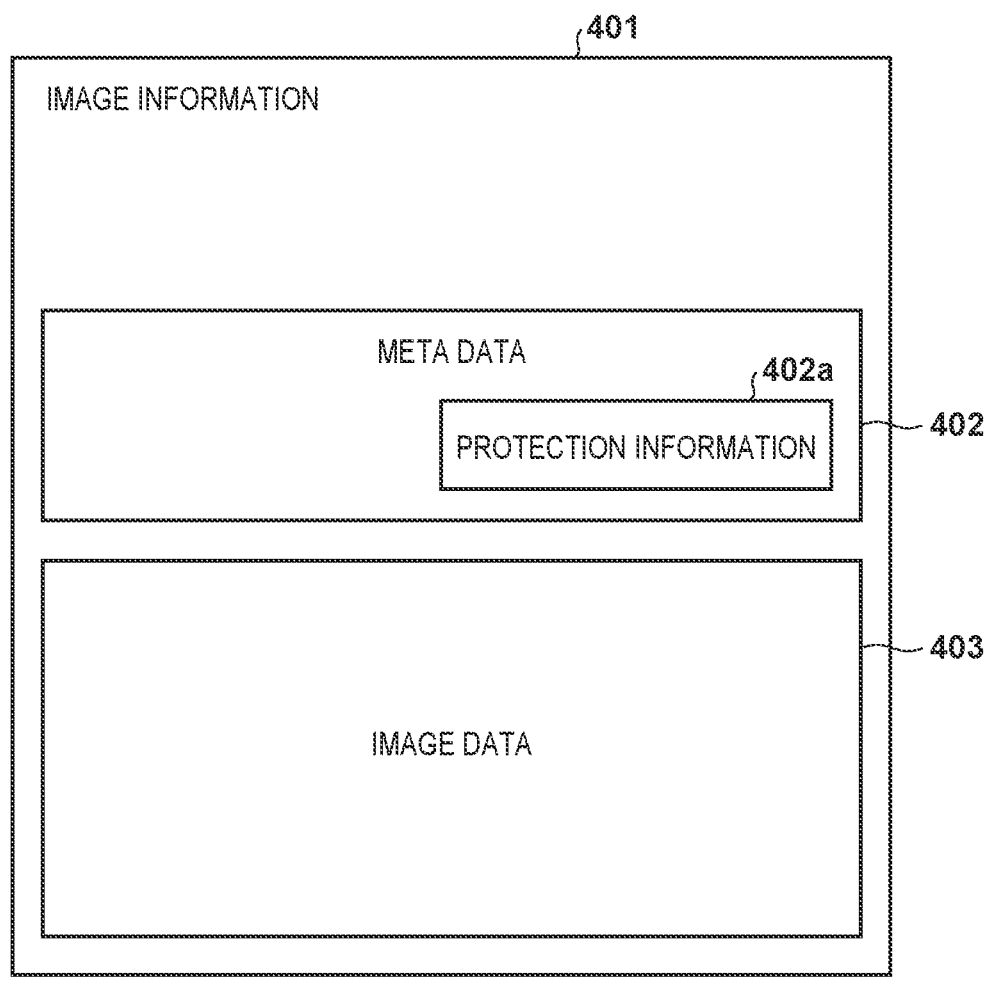
FIG. 4 is a diagram illustrating a data structure of image information according to the first embodiment.

FIG. 4 is a diagram illustrating a data structure of the image information. As illustrated in FIG. 4, image information 401 includes metadata 402 and image data 403. In the metadata 402, protection information 402a is recorded. There may be a case where the image information 401 only includes an image file including the image data 403, and a metadata file including the metadata 402 is prepared as a separate file.

In the present embodiment, the format of the metadata is not limited. Any format enabling the protection information to be recorded may be employed. A possible example of such a format includes Exif. The image data 403, which is pixel data, may also be data after spatial frequency transformation or data after compression and encryption, depending on the file format. In the present embodiment, the image data 403 may be saved in any file format. The file format may also be one including metadata, such as JPEG and TIFF. Even a file format without metadata for recording the protection information, such as bitmap and RAW, may be used, in combination with a metadata file, which is a separate file for recording the protection information.

In step S202, when the image information to be saved and the image save instruction are input to the image processing unit 107 from the control unit 102, the protection information determination unit 110 determines whether the protection information is recorded in the image information to be saved. When the protection information determination unit 110 determines that the protection information is recorded in the information to be saved, the processing proceeds to S203. When the protection information determination unit 110 determines that the protection information is not recorded in the image information to be saved, the processing proceeds to S204.

In step S203, the protection information saving unit 111 adds the protection information determined in S202 to image information to be newly saved. Then, the image processing unit 107 outputs, to the storage unit 104, the image information to be newly saved to which the protection information is added. In the process, the image processing unit 107 may output an image save completion notification to the control unit 102.

In step S204, the image information to be newly saved, acquired from the image processing unit 107, is saved in the storage unit 104.

The saving of the image information is assumed that the file of the image information 401 is recorded at a predetermined location in a file system. Still, in a system constantly running, a system not requiring a screenshot image or a copy image to be permanently held, or the like, the image information may not be recorded as the file of the image information 401, and may be recorded in the storage unit 104 to be read out from the storage unit 104 and used as required.

The timing when the image processing unit 107 outputs the image save completion notification to the control unit 102 may be after the processing in step S204. In this case, upon saving the image information to be newly saved, the storage unit 104 outputs the image save completion notification to the image processing unit 107. Upon receiving the image save completion notification, the image processing unit 107 outputs the image save completion notification to the control unit 102. Alternatively, the image processing unit 107 may not output the image save completion notification to the control unit 102, and the storage unit 104 may output the image save completion notification to the control unit 102 after saving the image information to be newly saved.

Figure 3B:
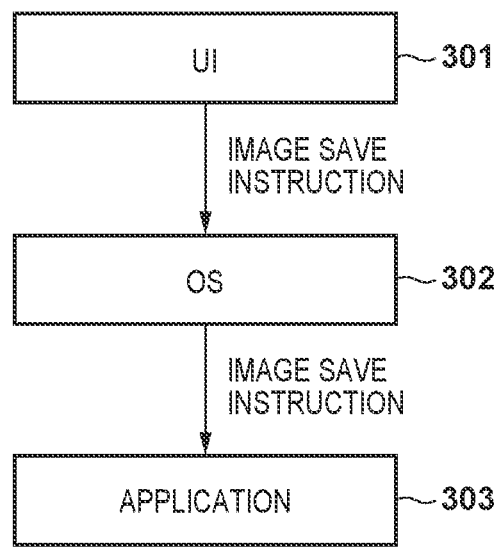
Figure 3C:
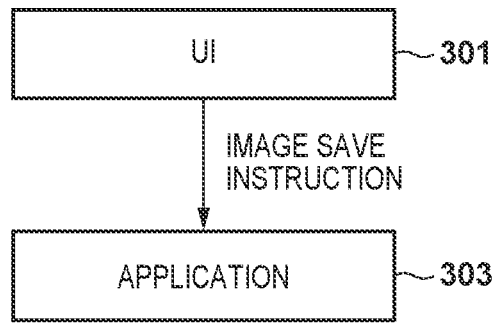

There may be a plurality of patterns regarding how the image save instruction is transmitted and received. FIG. 3A to FIG. 3C are diagrams illustrating three example pattern types. In FIG. 3A to FIG. 3C, a UI 301 is a UI screen displayed on the display unit 106. An OS 302 and an application 303 are software executed by the image processing apparatus 101. The image save instruction can be transmitted and received in the modes illustrated in FIG. 3A to FIG. 3C and the like. FIG. 3A illustrates a mode in which the image save instruction is output from the UI 301 to the OS 302, and the image information is saved by the function of the OS 302. FIG. 3B illustrates a mode in which the image save instruction is output from the UI 301 to the OS 302 and then the image save instruction is output from the OS 302 to the application 303, and the image information is saved as the function of the application 303. FIG. 3C illustrates a mode in which the image save instruction is output from the UI 301 to the application 303, and the image information is saved as the function of the application 303.

In a possible case according to the pattern illustrated in FIG. 3A, the OS 302 may receive the image save instruction in step S201 and execute the processing in step S202 and after. In a possible case according to the pattern illustrated in FIG. 3B, the OS 302 may receive the image save instruction in step S201 and output the image save instruction to the application 303. Then, the application 303 may receive the image save instruction and execute the processing in step S202 and after. Then, the application 303 may output an image save instruction completion notification to the OS 302. In a possible case according to the pattern illustrated in FIG. 3C, the application 303 may receive the image save instruction in step S201 and execute the processing in step S202 and after.

As details of the patterns of FIG. 3B and FIG. 3C, there may be a case where the application 303 has the image display function, and a case where the application 303 has no image display function, and only a screenshot image of the display screen is saved.

In the image saving processing of the present embodiment, when the protection information is added to the image information newly saved, the mask processing is applied for the image information to make the protection region unviewable. Key information is required to make the protection region viewable. Thus, even if the newly saved image information is redistributed, the protection region can be protected so as not to be viewable.

As described above, according to the present embodiment, when a new image is generated from an image to which the protection information is added and the new image is saved, the newly saved image is provided with the protection information and saved. Thus, the newly saved image can be protected in the same manner as that for the original image.

Second Embodiment

Next, a second embodiment will be described with reference to FIG. 5.

In the second embodiment, a description will be given on an example of a configuration in which control is performed to make a protection region of image information to be displayed viewable or unviewable depending on whether the user has the viewing authority, and of a configuration in which control is performed whether the image information to be saved is provided with the protection information and saved depending on whether the user has the viewing authority.

In an image processing apparatus 501 according to the second embodiment, the image processing unit 107 includes a viewing authority determination unit 502, in addition to the configuration according to the first embodiment illustrated in FIG. 1. The other configurations are the same as those in the first embodiment illustrated in FIG. 1.

The protection information determination unit 110 determines whether the protection information is recorded in the image information to be saved or the image information to be displayed. The protection information saving unit 111 adds the protection information recorded in the image information to be saved to the image information to be newly saved and save. Based on the protection information recorded in the image information to be displayed, the image processing unit 107 generates a display image on which the mask processing is applied to make the protection region unviewable for the image information to be newly displayed.

The image information to be displayed according to the present embodiment is original image information for generating the display image, and includes an image held by the image processing apparatus 501, a webpage or an image received by the communication unit 108 over the network, and a screenshot image or a copy image saved through the image saving processing of the first embodiment. The image information to be saved is original image information for generating a screenshot image or a copy image. The protection information will be described below with reference to FIG. 6A to FIG. 6C.

In the following description, the image information to be displayed includes one with the protection information recorded, and one without the protection information recorded. The user may or may not have the key information for viewing the protection information of the image information to be displayed.

<Image Display Processing>

First of all, processing of controlling the protection region in the image information to be displayed, to be viewable or unviewable depending on whether the user has the viewing authority, will be described with reference to FIG. 7A.

Figure 7A:
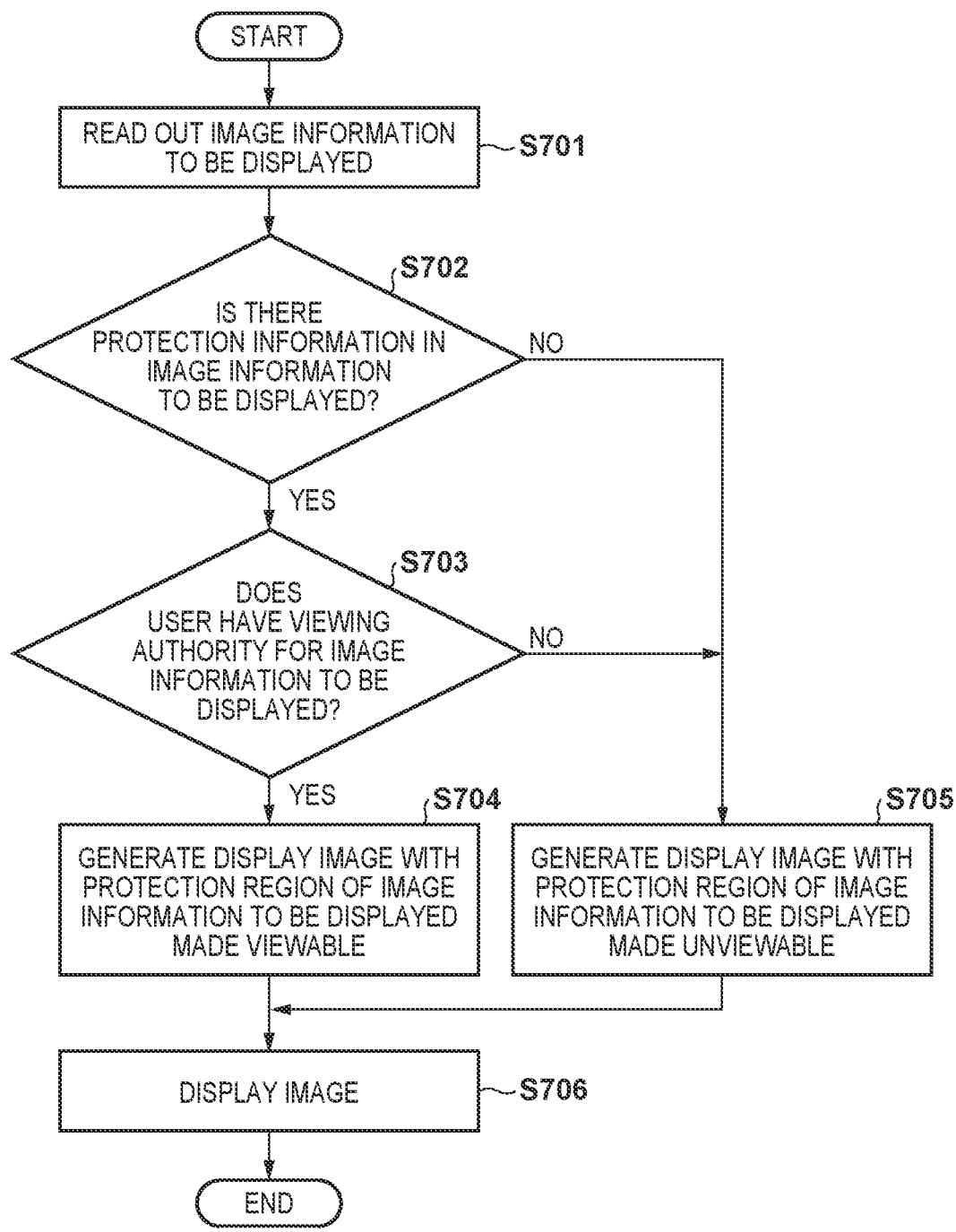
FIG. 7A and FIG. 7B are flowcharts illustrating image display processing and image saving processing according to a second embodiment.

FIG. 7A is a flowchart illustrating image display processing according to the present embodiment.

The processing in FIG. 7A is implemented by the control unit 102 of the image processing apparatus 501 executing a program stored in the storage unit 104, and controlling each of the components of the image processing apparatus 501. The processing in FIG. 7A starts when an instruction for displaying the image information on the display unit 106 is input to the control unit 102 by the user operating the operation unit 105.

In step S701, the control unit 102 reads out the image information to be displayed, and waits until the image display processing becomes executable by the control unit 102, with the image information to be displayed and an image generation instruction held in the memory 103. Once the image display processing becomes executable by the control unit 102, the control unit 102 outputs the image information to be displayed and the image generation instruction to the image processing unit 107. Note that image information acquired from the outside over the network may be saved in the storage unit 104.

In step S702, when the image information to be displayed and the image generation instruction are input to the image processing unit 107 from the control unit 102, the protection information determination unit 110 determines whether the protection information is recorded in the image information to be displayed. When the protection information determination unit 110 determines that the protection information is recorded in the image information to be displayed, the processing proceeds to S703. When the protection information determination unit 110 determines that the protection information is not recorded in the image information to be displayed, the processing proceeds to S705.

In step S703, the viewing authority determination unit 502 determines whether the user has the viewing authority for the image information to be displayed. When the viewing authority determination unit 502 determines that the user has the viewing authority for the image information to be displayed, the processing proceeds to S704. When the viewing authority determination unit 502 determines that the user does not have the viewing authority for the image information to be displayed, the processing proceeds to S705. An example of a possible method for determining whether the viewing is restricted includes determining whether the image processing apparatus 501 has the key information for the protection information recorded in the image information to be displayed. The key information may be acquired from the outside over the network and the like and stored in the storage unit 104 of the image processing apparatus 501, and may be acquired over the network at a timing of determination on whether the user has the viewing authority.

In step S704, based on the protection information recorded in the image information to be displayed, the image processing unit 107 generates the display image with the protection region of the image information to be displayed made viewable. Then, the processing proceeds to step S706.

In step S705, the image processing unit 107 generates a display image with the protection region of the image information to be displayed made unviewable. Then, the processing proceeds to step S706.

Figure 6A:
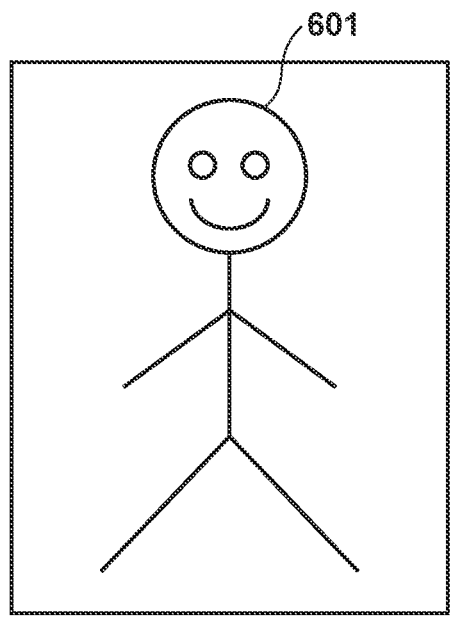
FIG. 6A to FIG. 6C are diagrams illustrating display images according to the second embodiment.
Figure 6B:
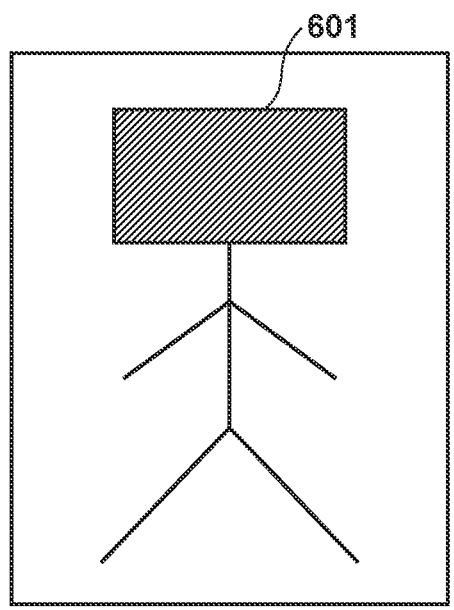
Figure 6C:
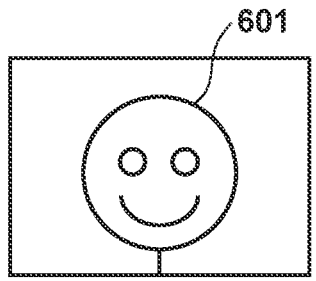

FIG. 6A to FIG. 6C are diagrams illustrating display images of the present embodiment.

The image information to be displayed is assumed to be an image with a protection region 601 made unviewable as illustrated in FIG. 6B. In this case, when the protection information is recorded in the image information to be displayed, or when the user has the viewing authority, encrypted image information in the protection region 601 in FIG. 6C is decrypted using the key information. Thus, the display image restored from the image illustrated in FIG. 6B, that is, the image with the protection region 601 made viewable as illustrated in FIG. 6A is generated. On the other hand, when the protection information is not recorded in the image information to be displayed, or the user does not have the viewing authority, the image in FIG. 6B, that is, an image with the protection region 601 in FIG. 6A made unviewable is generated.

In the present embodiment, in the metadata 402 of the image information 401 in FIG. 4, image information with the image of the protection region 601 in FIG. 6C encrypted, the key information for decrypting the encrypted image of the protection region 601 in FIG. 6C, and coordinate data indicating the position where the decrypted image of the protection region 601 in FIG. 6C is to be restored for the image with the mask processing applied on the protection region 601 as illustrated in FIG. 6B are recorded as the protection information. The key information may not be recorded in the metadata 402, and may be held by the image processing apparatus 501 or may be acquired from the outside over the network, as long as the information can be acquired at the time of decrypting.

For example, when the image of the protection region 601 in FIG. 6 (has a rectangular shape and includes metadata describing the size of the image, the coordinate data may be coordinate information indicating coordinates (X, Y) of the upper left point. When the metadata describing the size of the image in FIG. 6C is not included or when the image is decrypted to have a size different from that described in the metadata of the image in FIG. 6C, coordinate data on a width W and a height H is recorded in the metadata, in addition to the coordinate information indicating the coordinates (X, Y) of the upper left point. The image in FIG. 6A is restored using these pieces of coordinate data.

In step S706, the image processing unit 107 outputs the display image generated in step S704 or S705 and an image generation completion notification to the control unit 102. Upon receiving the image generation completion notification from the image processing unit 107, the control unit 102 outputs the display image to the display unit 106. The display unit 106 displays the display image input from the control unit 102.

With the image display processing of the present embodiment, the protection region is displayed to be viewable when the protection information is recorded in the image information to be displayed or when the user has the viewing authority, but the protection region is displayed to be unviewable when the protection information is not recorded in the image information to be displayed or when the user does not have the viewing authority.

In the present embodiment, an example of a configuration of controlling the protection region in the image information to be displayed, to be viewable or unviewable depending on whether the user has the viewing authority is described, but this should not be construed in a limiting sense. For example, also when an image is displayed on a display device provided separately from the image processing apparatus 501 of the present embodiment, the image illustrated in FIG. 6B can be displayed as the display image, because the image in FIG. 6C encrypted is recorded in the metadata 402 as the protection information for the image information to be displayed. Thus, also when an image is displayed on a display device provided separately from the image processing apparatus 501 of the present embodiment, the image as illustrated in FIG. 6B with the protection region made unviewable can be displayed when the user does not have the viewing authority for the image information to be displayed.

Figure 8A:
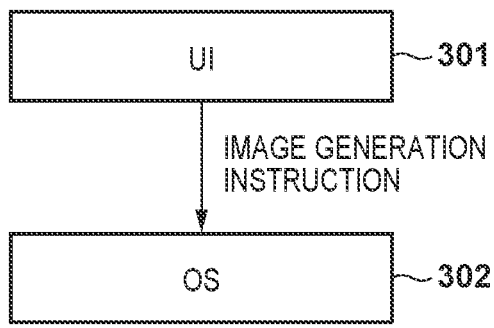
FIG. 8A to FIG. 8C are diagrams illustrating image generation instructions according to the second embodiment.
Figure 8B:
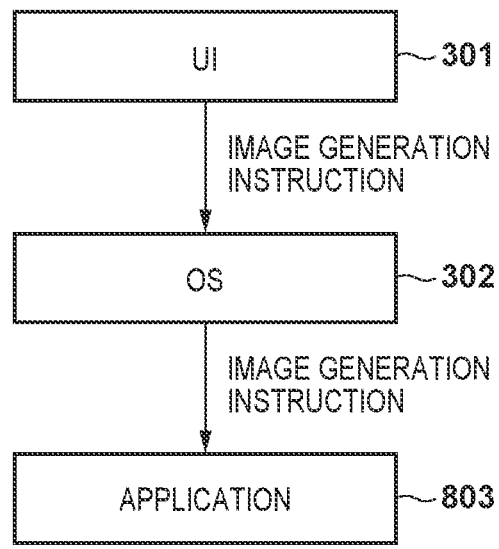
Figure 8C:
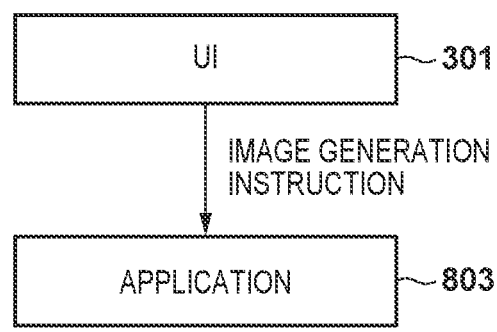

There may be a plurality of patterns regarding how the image generation instruction is transmitted and received. FIG. 8A to FIG. 8C are diagrams illustrating three example pattern types. The image generation instruction can be transmitted and received in the modes illustrated in FIG. 8A to FIG. 8C and the like. FIG. 8A illustrates a mode in which the UI 301 outputs the image generation instruction to the OS 302, and the display image is generated with control for viewing restriction performed as the function of the OS 302. FIG. 8B illustrates a mode in which the UI 301 outputs the image generation instruction to the OS 302, the OS 302 outputs the image generation instruction to an application 803, and the display image is generated with the control for viewing restriction performed as the function of the application 803. FIG. 8C illustrates a mode in which the UI 301 outputs the image generation instruction to the application 803, and the display image is generated with the control for viewing restriction performed as the function of the application 803.

As described above, with the image display processing of the present embodiment, the protection region of the image information to be displayed can be controlled to be viewable or unviewable.

Furthermore, with the present embodiment, control can be performed to or not to save the image information to be saved with the protection information added thereto, depending on whether the user has the viewing authority.

<Image Saving Processing>

Next, processing of performing control to or not to save the image information to be saved with the protection information added thereto, depending on whether the user has the viewing authority, will be described with reference to FIG. 7B.

Figure 7B:
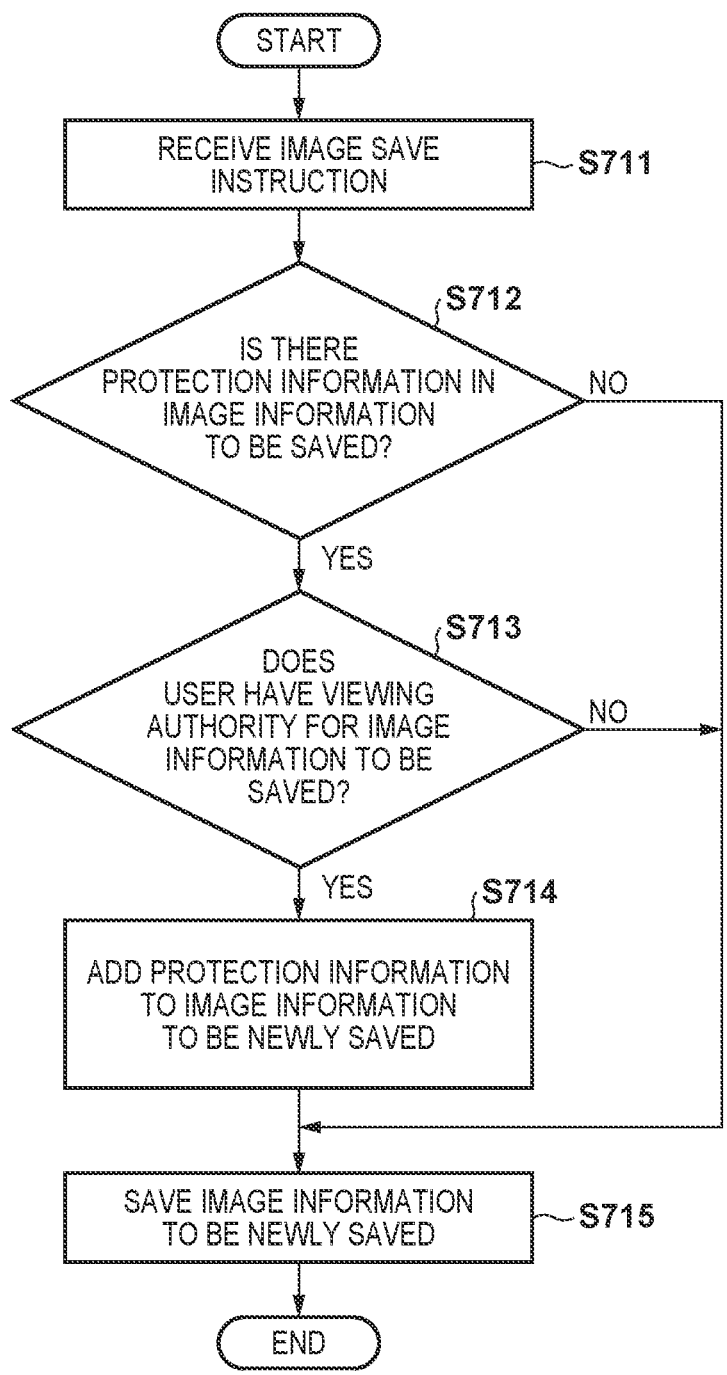

FIG. 7B is a flowchart illustrating image saving processing according to the present embodiment.

The processing in FIG. 7B is implemented by the control unit 102 of the image processing apparatus 501 executing a program stored in the storage unit 104, and controlling each of the components of the image processing apparatus 501. The processing in FIG. 7B starts when a screenshot instruction or a copy instruction is input to the control unit 102 by the user operating the operation unit 105 in a state in which image information to be displayed such as a webpage or a reproduced image is displayed on the display unit 106 of the image processing apparatus 501.

Similar processing as those in steps S201 and S202 in FIG. 2 are performed in steps S711 and S712.

When the protection information determination unit 110 determines that the protection information is recorded in the image information to be saved in step S712, the processing proceeds to S713. When the protection information determination unit 110 determines that the protection information is not recorded in the image information to be saved, the processing proceeds to S715.

In step S713, the viewing authority determination unit 502 determines whether the user has the viewing authority for the image information to be saved. When the viewing authority determination unit 502 determines that the user has the viewing authority for the image information to be saved, the processing proceeds to S714. When the viewing authority determination unit 502 determines that the user does not have the viewing authority for the image information to be saved, the processing proceeds to S715.

Similar processing as those in steps S203 and S204 in FIG. 2 are performed in steps S714 and S715.

With the image saving processing of the present embodiment, image information to be newly saved has the mask processing applied to make the protection region 601 in FIG. 6B unviewable, when the protection information is recorded in the image information to be saved and the user has the viewing authority for the image information to be saved. Key information is required to make the protection region viewable. Thus, even if the newly saved image information is redistributed, the protection region can be protected so as not to be viewable.

When the protection information is not recorded in the image information to be saved or when the user does not have the viewing authority for the image information to be saved, no protection information needs to be added to the image information to be newly saved. Thus, only the image information having the mask processing applied to make the protection region 601 unviewable as in FIG. 6B is saved.

As described above, with the image saving processing of the present embodiment, control can be performed to or not to save the image information to be saved with the protection information added thereto, depending on whether the user has the viewing authority.

The timing when the image processing unit 107 outputs the image save completion notification to the control unit 102 may be after the processing in step S715. In this case, when the control unit 102 outputs the image save completion notification to the display unit 106, the image processing unit 107 outputs the image save completion notification to the control unit 102. Alternatively, the image processing unit 107 may not output the image save completion notification to the control unit 102, and may output the image save completion notification to the control unit 102 after the display unit 106 has displayed the image.

The application 303 in FIG. 3B and FIG. 3C and the application 803 in FIG. 8B and FIG. 8C are logically different applications, but may be the same application.

Third Embodiment

Next, a third embodiment will be described with reference to FIG. 9.

In the third embodiment, an example is described in which when the image information to be saved is not displayed with the original image size, the protection information of the image information to be saved is updated and displayed.

In the present embodiment, when the protection information is added to the image information to be newly saved in step S203 in FIG. 2 and step S714 in FIG. 7B, the protection information included in the metadata 402 is updated, and the updated protection information is added.

It is assumed that, in the metadata 402 of the image information 401, the image in FIG. 6C encrypted, the key information used for decrypting the image in FIG. 6C encrypted, and coordinate data indicating the position where the image in FIG. 6C is to be restored in the image in FIG. 6B, are recorded as the protection information. A possible example of the coordinate data includes coordinate information indicating the coordinates (X, Y) of the upper left point, when the image illustrated in FIG. 6C is a rectangular image.

Figure 9:
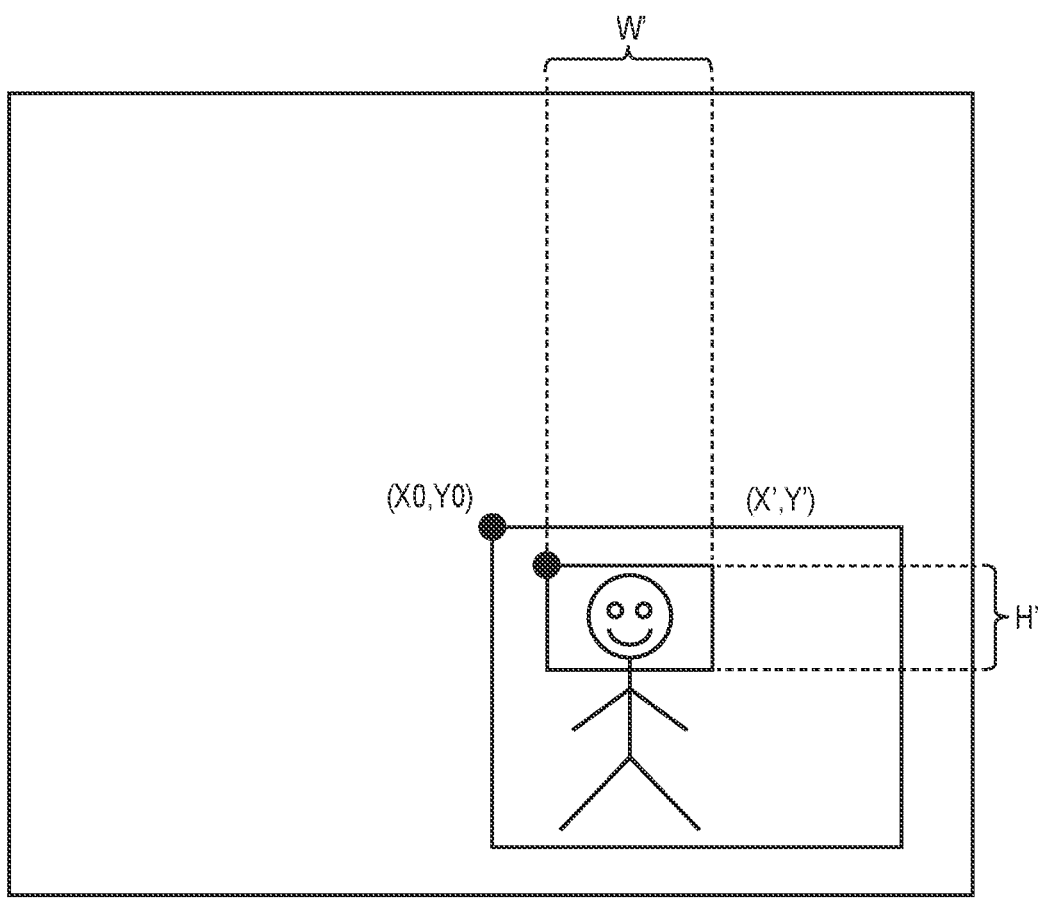
FIG. 9 is a diagram illustrating a method of updating image information and protection information according to a third embodiment.

Still, when, as illustrated in FIG. 8B and FIG. 8C, the image generated as the function of the application 803 is displayed, as illustrated in FIG. 9, the display image is not necessarily displayed with the original image size as illustrated in FIG. 6A or FIG. 6B. In this case, the image information (screenshot image) to be saved is saved with a size different from the original image size. And, the image is displayed at a position (X0, Y0) that is a display position offset with respect to the overall position in the original image. Also, the image obtained by decrypting the image in FIG. 6C encrypted, would not have a size defined by the width W and the height H. Also in a case where the image in FIG. 6C encrypted is decrypted to restore the image in FIG. 6B, the image needs to be restored at a position different from the coordinates (X, Y) of the image in FIG. 6B, which is the protection information before the update.

Thus, in the present embodiment, when the protection information is added to the image information to be newly saved in step S203 in FIG. 2, the display size of the image information to be saved is acquired, and scaling ratios for the horizontal and vertical directions in the screen are calculated from the display size acquired and a size of the original image information (image information to be saved before the display size is changed). A width W' and a height H' that are the display sizes of the image in FIG. 6C are obtained from the size of the image in FIG. 6C, which is the protection information before the update, the width W and the height H, and the scaling ratios obtained. Coordinates (X', Y') of the image information to be saved after the update are obtained from coordinates (X0, Y0) of a position offset from the position of the image in FIG. 6A or FIG. 6B, the coordinates (X, Y) of the image in FIG. 6B, which is the protection information before the update, and the scaling ratios obtained.

With the information thus obtained being the protection information after the update, the image in FIG. 6C encrypted, the key information used for decrypting the image in FIG. 6C encrypted, and the coordinate data indicating the position where the image in FIG. 6C is to be restored in the image in FIG. 9 are added to the metadata 402 of the image information to be newly saved. The coordinate data includes the coordinate information indicating the coordinates (X'. Y') of the upper left point, and the width W' and the height H'.

With the present embodiment, when the display image is not displayed with the original image size, the protection information of the image information to be newly saved can be updated and saved based on the display image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-174069, filed Oct. 25, 2021 which is hereby incorporated by reference herein in its entirety.

What is claimed is:

1. An image processing apparatus comprising:
a display unit;
a memory, including instructions stored thereon, which when executed by the processor cause the image processing apparatus to:
generate an image to be saved; and
in response to an instruction for generating a second image from a first image and saving the second image:
determine whether protection information for protecting at least a part of the image is recorded in the image to be displayed; and
determine whether a user has a viewing authority for the image to be displayed,
wherein
in a case where the user has the viewing authority, generate an image in which a protection region in the image to be displayed is viewable,
in a case where the user does not have the viewing authority, generate an image in which the protection region in the image to be displayed is made unviewable,
wherein in a state that the image is displayed the protection region is viewable, when the second image is saved in response to the instruction, add second protection information to the second image and save the second image, the second protection information being based on the protection information recorded in the first image for protecting at least a part of the image,
wherein in a state that the image is displayed the protection region is unviewable, when the second image is saved in response to the instruction, second protection information is not added to the second image and save the second image,
wherein the second image includes an image processed a protection region included in at least a part of the first image cannot be viewed, and
wherein in the protection information, at least data with an image of the protection region being encrypted and data indicating a position, wherein a decrypted image of the protection region is to be restored for the second image, are recorded; and
update, for the protection information to be added to the second image, a size of the image of the protection region in the protection information and the data indicating the position where the image of the protection region is to be restored for the second image, based on a size of the first image and a size at which the first image is displayed.

2. The apparatus according to claim 1, wherein the istructions, when executed by the processor, further cause the apparatus to:
determine whether a user has a viewing authority for the first image, and
based on determining that the user does not have the viewing authority, save the second image without the protection information added to the second image.

3. The apparatus according to claim 2, wherein the instructions, when executed by the processor, further cause the apparatus to:
determine whether the user has the viewing authority, based on presence or absence of information for decrypting the encrypted data.

4. The apparatus according to claim 1, wherein
the second image is a screenshot image or a copy image of the first image.

5. A method of controlling an image processing apparatus comprising:
receiving an instruction for generating a second image from a first image and saving the second image; and
in response to an instruction for generating a second image from a first image and saving the second image:
determine whether protection information for protecting at least a part of the image is recorded in the image to be displayed; and
determine whether a user has a viewing authority for the image to be displayed,
wherein
in a case where the user has the viewing authority, generate an image in which a protection region in the image to be displayed is viewable, and
in a case where the user does not have the viewing authority, generate an image in which the protection region in the image to be displayed is made unviewable,
wherein in a state that the image is displayed the protection region is viewable, when the second image is saved in response to the instruction, add second protection information to the second image and save the second image, information being based on the protection information recorded in the first image for protecting at least a part of the image,
wherein in a state that the image is displayed the protection region is unviewable, when the second image is saved in response to the instruction, second protection information is not added to the second image and save the second image,
wherein the second image includes an image processed a protection region included in at least a part of the first image cannot be viewed, and
wherein in the protection information, at least data with an image of the protection region being encrypted and data indicating a position, where a decrypted image of the protection region is to be restored for the second image, are recorded; and update, for the protection information to be added to the second image, a size of the image of the protection region in the protection information and the data indicating the position where the image of the protection region is to be restored for the second image, based on a size of the first image and a size at which the first image is displayed.

6. A non-transitory computer-readable storage medium storing a program for causing a computer to function as an image processing apparatus comprising:
  generate an image to be saved; and
  in response to an instruction for generating a second image from a first image and saving the second image:
    determine whether protection information for protecting at least a part of the image is recorded in the image to be displayed; and
    determine whether a user has a viewing authority for the image to be displayed,
  wherein
    in a case where the user has the viewing authority, generate an image in which a protection region in the image to be displayed is viewable, and
    in a case where the user does not have the viewing authority, generate an image in which the protection region in the image to be displayed is made unviewable,
  wherein in a state that the image is displayed the protection region is viewable, when the second image is saved in response to the instruction, add second protection information to the second image and save the second image, information being based on the protection information recorded in the first image for protecting at least a part of the image,
  wherein in a state that the image is displayed the protection region is unviewable, when the second image is saved in response to the instruction, second protection information is not added to the second image and save the second image,
  wherein the second image includes an image processed a protection region included in at least a part of the first image cannot be viewed, and
  wherein in the protection information, at least data with an image of the protection region being encrypted and data indicating a position, where a decrypted image of the protection region is to be restored for the second image, are recorded; and
  update, for the protection information to be added to the second image, a size of the image of the protection region in the protection information and the data indicating the position where the image of the protection region is to be restored for the second image, based on a size of the first image and a size at which the first image is displayed.

* * * * *